UNITED STATES PATENT OFFICE 2,495,150

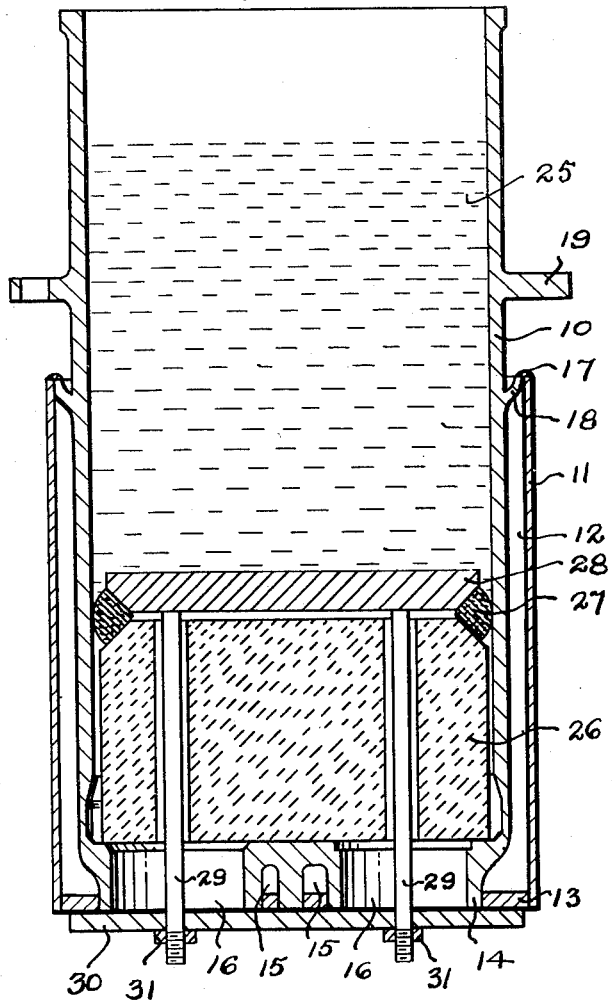

METHOD OF CONDITIONING METAL MEMBERS FOR A WELDING OPERATION

Ralph E. Van Deventer, Detroit, Mich., assignor to Packard Motor Car Company, Detroit, Mich., a corporation of Michigan Application April 2, 1945, Serial No. 586,116

8 Claims. (Cl. 113—112)

This invention relates to a method of conditioning metal members for a welding operation.

Some hollow metal members are provided with a surrounding chamber by the welding of a metal jacket to flanges projecting therefrom. When the member is an engine cylinder barrel the chamber provides a coolant receiving space. Engine cylinder barrels are usually heat treated prior to the jacket application to harden the inner wall surface to be contacted by piston rings. At least one of the flanges overlies the hardened wall across which the piston operates and such flange is generally relatively thin.

The welding operation rapidly raises the temperature of the flange to several times that of the draw temperature of the barrel during the prior hardening heat treatment operation. The rise and fall of temperature resulting from the welding operation is rapid so that the physical characteristics of the barrel wall in the zone of the weld are changed. Thus the normal flow of heat from the flange may soften the hardened interior surface of the wall. As the flange is relatively thin its temperature is quickly raised to maximum during the welding operation and its temperature will drop off rapidly after the welding operation due to the larger mass of adjacent colder metal. Because of such thermal cycle the flange has been stressed so that cracks are created through which coolant will leak from the formed chamber.

It is an object of the invention to eliminate the previously mentioned undesirable conditions resulting from a welding operation by a method controlling the barrel temperature.

Another object of the invention is to eliminate the above difficulties encountered in welding a jacket to a flange on a hollow article by a method controlling the temperature of the article through the use of a molten medium.

Another object of the invention is to prevent a flange on a hollow metal article from being adversely stressed by the welding of a jacket thereto.

Still another object of the invention is to prevent annealing of a hardened hollow article during the operation of welding a jacket thereto by controlling the temperature of the article with a molten medium.

Another object of the invention is to shield the head of a cylinder barrel having ports therethrough from the heat of a molten medium, employed in the barrel to regulate its temperature during a welding operation, so that the residual compression stresses created by a previous shot blasting operation thereon will be preserved.

Other objects of the invention will appear from the following description taken in connection with the drawing which is a sectional view of a hollow article being conditioned during and after the operation of welding a jacket to a flange thereon.

In the drawing, the flanged member is illustrated as an engine barrel 10 to which a jacket 11 is welded to form a chamber 12 for receiving coolant. A head plate 13 is fixed to the head 14 of the barrel and closes a coolant chamber 15 surrounding the intake and exhaust ports 16. The head plate is of larger diameter than the barrel head and one end of the jacket is welded thereto while the other end of the jacket is welded at 17 to a flange or lip 18 extending around the skirt portion of the barrel and projecting radially therefrom. This flange curves outwardly and in a direction away from the barrel head so that the outer portion thereof will extend parallel with and close to the adjacent end of the jacket. This flange 18 is relatively thin and is formed as an integral part of the barrel. A base 19 is also formed integral with the barrel and serves as a support that may be suitably anchored. The jacket, when welded to the head plate 13 and flange 18, closes the coolant receiving chamber 12 that communicates with the head chamber 15 and the usual engine coolant system (not shown).

The barrel, head plate and jacket are formed of metal, the jacket being formed preferably of stainless steel and the barrel and head flange being formed preferably of an alloy steel containing approximately .40% carbon. Prior to welding the jacket to the barrel, the barrel head surface is shot blasted to create residual compression stress and the barrel is heat treated to harden the inner wall surface to prevent wear by piston rings that will contact therewith. The draw temperature of the heat treating operation may vary but it will be assumed to be 1050° F. It will also be assumed that the maximum temperature of the flange 18 during the welding operation is 2700° F. This high welding temperature is rapidly developed and quickly spreads to the colder adjacent portion of the barrel wall so that the sudden rise and fall of the temperature during and after welding will reduce the hardness of the adjacent hardened inner wall surface if its temperature exceeds the draw temperature of the prior heat treatment.

The thin flange 18, being of an alloy steel of approximately .40% carbon content, hardens to about Rockwell C 48 to 50 due to rapid cooling after the welding operation caused primarily by the large mass of colder steel in the adjacent barrel wall. The flange is thus stressed by the temperature change therein during the welding thermal cycle due to the volume increase which occurs in hardening that causes a reduction of its ductility so that cracks develop therein through which coolant will leak from the chamber 12.

By the present invention it is proposed to control the barrel temperature so that the changes in the thermal cycle will not adversely affect the properties of the flange, the hardened wall adjacent the flange or the stressed head surfaces. This is done by conditioning the barrel and flange for the welding operation by a method of controlling the temperature thereof through the use of a body of molten medium as indicated at 25 placed in intimate contact with the barrel wall.

Before pouring the molten medium the barrel is shifted so that the head is lowermost and the ports 16 are closed by means consisting of a plug or filler member 26 and a seal ring 27. The plug member is seated on the inner surface of the head to overlie the ports and the seal ring bears against the tapered upper end of the plug member and the barrel wall. The plug member may be formed of some suitable refractory material that will transfer little heat while the seal ring may be formed of asbestos or some similar material. The plug member and seal are fastened in position by clamp means consisting of plate 28 bearing against the seal ring, plate 30 bearing against the outer surface of the barrel head, studs 29 attached to plate 28 and extending through openings in the plug member and plate 30, and nuts 31 on the studs. The nuts are turned to wedge the seal ring against the plug member and the barrel, thus preventing liquid from flowing below the seal ring and clamping the plug member against the barrel head. The volume of molten conditioner employed must be sufficient to rapidly absorb heat from the barrel wall portion adjacent the flange during the welding operation so that the barrel will not become annealed. In the present showing the plug or filler member 26 occupies considerable space so that the head portion of the barrel will be shielded from the heat of the molten medium sufficiently to prevent reduction of the residual compression stresses created by the prior shot blasting treatment.

A suitable temperature control medium must be capable of being molten in a desired temperature range. In the present instance the range must be between 650° and 800° F. and a salt, consisting of sodium nitrite and potassium nitrate, or lead may be satisfactorily employed. The salt or lead medium is preferably poured into the open skirt end of the barrel in molten form and is left therein during the preheating, welding and cooling periods. The preheat temperature of the medium in this instance must be in excess of 600° F., but a temperature between 750° F. and 800° F. is believed to be most desirable for the specific barrel structure illustrated. Of course the medium could be brought to desired temperature after being introduced in the barrel. This molten medium serves to pre-heat the barrel so that its temperature is relatively high just before the welding operation, but low enough to rapidly absorb the welding heat flowing to the wall from the flange to prevent the temperature of the hardened inner surface from exceeding the heat treatment draw temperature. This preheating of the cylinder by a medium of the character specified prevents a sudden temperature rise in the flange and wall and absorbs heat from the portion of the barrel wall adjacent the flange during welding rapidly enough to prevent annealing of the wall. The heated body of liquid is of a character that cools off relatively slowly and it will therefore retard a quick drop in temperature of both the flange and adjacent wall during the critical cooling period after welding, which is only a few seconds, thereby eliminating annealing the wall and adversely stressing the flange. If necessary, the temperature of the liquid after being poured into the barrel may be maintained at the desired preheat temperature by the use of a suitable submerged heater.

Preheating of the barrel reduces change in the physical properties of the metal and the use of molten salt or lead as a temperature conditioner transforms the steel isothermally at a sufficiently high temperature to prevent hardening. The molten medium is used at a high temperature both as a preheating medium to reduce the thermal stresses and hardening normally caused by the welding operation, and at the same time as an equalizing medium to carry the heat away from one portion of the barrel to prevent overheating of the wall adjacent the weld.

It will be understood that various forms of the invention other than that described above may be used without departing from the spirit or scope of the invention.

What is claimed is:

1. In the welding of a jacket to a flange extending from the wall of a steel member, the method of preserving the physical properties of the wall and preventing the creation of undesirable stresses in the flange which comprises controlling the temperature of the member prior to, during, and after the welding operation by maintaining in intimate contact with the wall surface thereof, adjacent the flange, a body of molten material the temperature of which ranges between approximately 650° F. and approximately 800° F.

2. In the welding of a metal jacket to an exterior flange around a steel cylinder barrel for engines having a heat treated hardened interior surface, the method of preserving the hardness of the interior barrel surface and preventing undesirable stresses in the flange comprising filling the interior of the barrel, in a zone including the flange, with a body of molten material the temperature of which ranges between approximately 650° F. and approximately 800° F. to materially raise the temperature of the metal prior to welding the jacket to the flange, the temperature of the wall of the barrel being thus maintained during the welding operation below that to which it was raised in the final operation of a previous heat treatment after hardening but high enough to materially retard temperature drop in the flange during the critical metal cooling period after welding, and then removing the conditioner from the barrel.

3. The method of welding together two metallic members one of which is fabricated of steel and the temperature of which must be maintained below that temperature to which it was raised in the final operation of a previous heat treatment after hardening in order to preserve its physical properties, comprising maintaining in intimate contact with said steel member during and after the welding operation a body of molten material the temperature of which ranges between approximately 650° F. and approximately 800° F.

4. The method of welding together two metallic members one of which is fabricated of steel and the temperature of which must be maintained below that temperature to which it was raised in the final operation of a previous heat treatment after hardening in order to preserve its physical properties, comprising preheating said member by bringing into intimate contact therewith a body of molten material the temperature of which ranges between approximately 650° F. and approximately 800° F., and maintaining said body of molten material in contact with said steel member during and after the welding operation.

5. The method of welding together two metallic members one of which is fabricated of steel and the temperature of which must be maintained below that temperature to which it was raised in the final operation of a previous heat treatment after hardening in order to preserve its physical properties, comprising maintaining in intimate contact with said steel member during and after the welding operation a body of molten salt, the temperature of which ranges between approximately 650° F. and approximately 800° F.

6. The method of welding together two metallic members at least one of which is fabricated of steel and the temperature of which must be maintained below that temperature to which it was raised in the final operation of a previous heat treatment after hardening in order to preserve its physical properties, comprising maintaining in intimate contact with said steel member during and after the welding operation a body of molten salt consisting of potassium nitrate and sodium nitrate.

7. The method of welding together two metallic members one of which is fabricated of steel and the temperature of which must be maintained below that temperature to which it was raised in the final operation of a previous heat treatment after hardening in order to preserve its physical properties, comprising maintaining in intimate contact with said member during and after the welding operation a body of molten lead.

8. In the welding of a jacket to a flange extending laterally from the wall of a steel cylinder having a barrel portion and a previously shot blasted head portion, the method of preserving the physical properties of the wall and head and preventing undesirable stresses in the flange comprising shielding the interior of the head portion of the barrel by means of a fluid tight transversely extending partition member, introducing into the interior of the barrel so as to make intimate contact with the inner wall surface thereof in the zone of the weld, a body of molten material the temperature of which ranges between approximately 650° F. and approximately 800° F., and maintaining said molten material in such position during and after the welding operation.

RALPH E. VAN DEVENTER.

REFERENCES CITED

The following references are of record in the file of this patent:

UNITED STATES PATENTS

| Number | Name | Date |
| --- | --- | --- |
| 1,386,007 | Lynn | Aug. 2, 1921 |
| 1,615,591 | Mallory | Jan. 25, 1927 |
| 2,034,418 | Plant | Mar. 17, 1936 |
| 2,174,867 | Bellis | Oct. 3, 1939 |
| 2,176,602 | Beck | Oct. 17, 1939 |
| 2,184,534 | Smith et al. | Dec. 26, 1939 |
| 2,226,243 | Herz | Dec. 24, 1940 |
| 2,264,004 | Patterson | Nov. 25, 1941 |
| 2,283,959 | Vincent | May 26, 1942 |
| 2,332,368 | Burtenshaw | Oct. 19, 1943 |
| 2,350,532 | Richardson | June 6, 1944 |